Dec. 3, 1968 W. C. WALKER 3,413,848
PICK TESTING DOCTOR BLADE ASSEMBLY
Filed Oct. 25, 1966
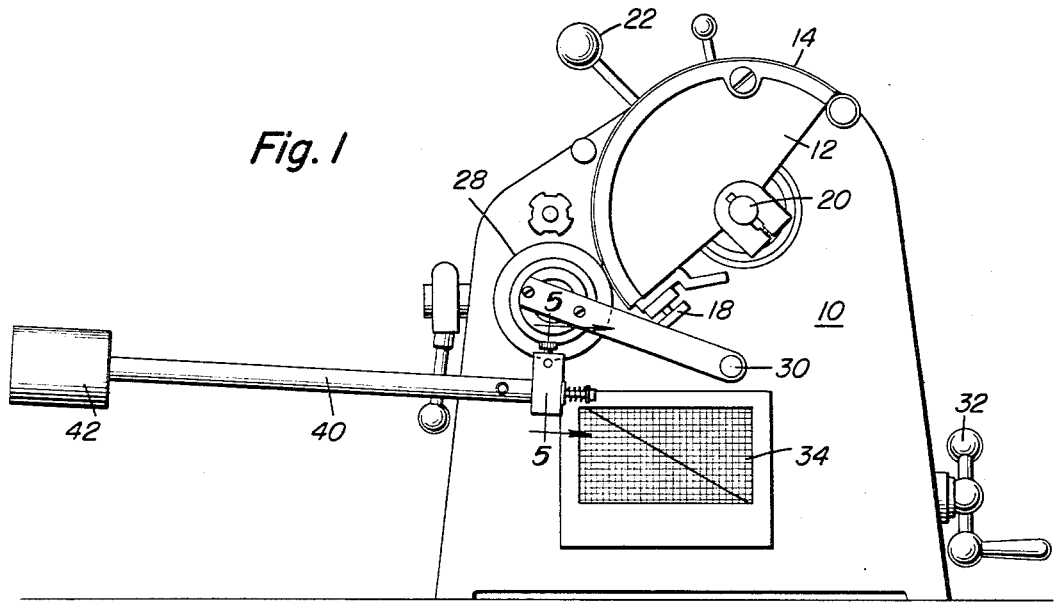
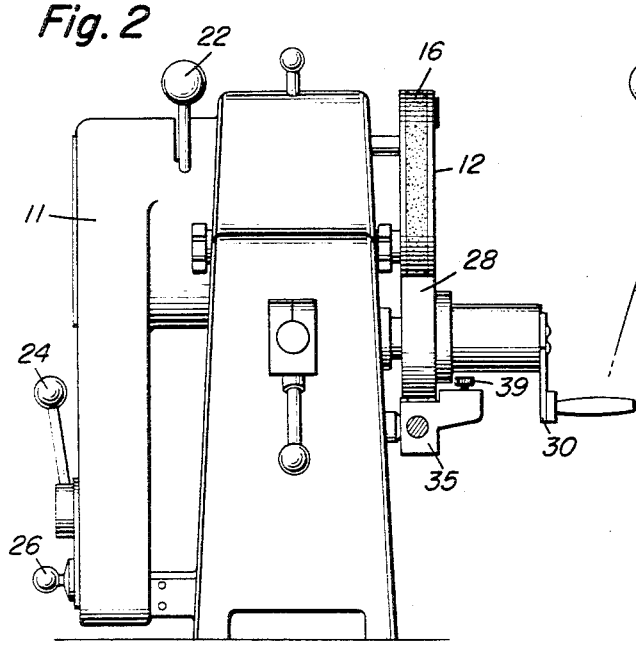
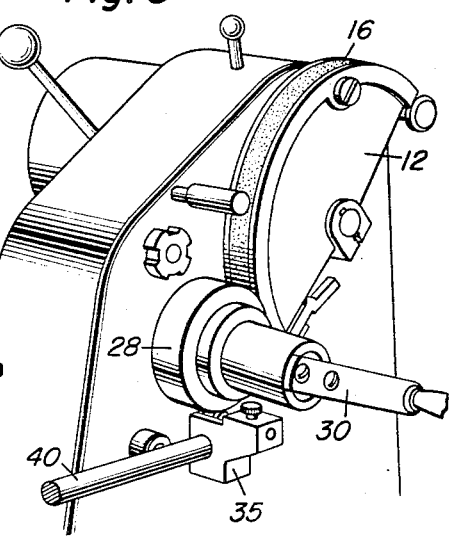
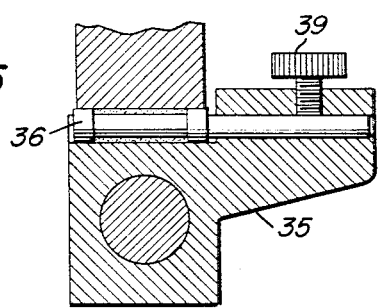
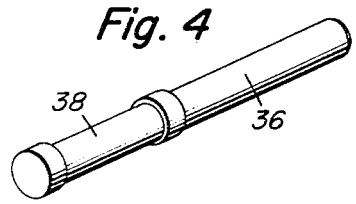
INVENTOR.
William C. Walker
BY
Larry C. Hall
ATTORNEY

United States Patent Office 3,413,848
Patented Dec. 3, 1968

3,413,848
PICK TESTING DOCTOR BLADE ASSEMBLY
William C. Walker, New York, N.Y., assignor to West Virginia Pulp and Paper Company, New York, N.Y., a corporation of Delaware
Filed Oct. 25, 1966, Ser. No. 589,407
1 Claim. (Cl. 73—150)

ABSTRACT OF THE DISCLOSURE

An apparatus for measuring the tendency of paper to be pulled apart by the ink on the rollers of a printing machine. Such devices are called pick testers and simulate conditions present in a printing machine. The disclosed pick tester utilizes a grooved rod for metering the ink onto the inking disc.

---

This invention relates to pick testing instruments and more specifically to a pick testing instrument having an improved inking assembly.

The subject matter of this invention comprises an improvement on the device disclosed in my prior U.S. Patent No. 3,120,755, patented Feb. 11, 1964, to a "Pick Testing Apparatus." In that patent the defination of "pick" and the different types of pick tests were described. The invention of my prior patent like the improvement herein disclosed is adapted to be used on the pick testing instrument manufactured and sold by the Institute für Grafische Tecknik and generally known as the "IGT print tester."

Modern pick testers have been designed essentially as small printing presses. With actual printing of the paper during the test, the factors operating during picking failures on a printing press should be simulated successfully even if they are not completely understood. Of the new pick testers, the IGT print tester has received the most attention because it appears to simulate printing action well and is quite convenient to use. The results from this instrument in its original form were not reliable, however, because of difficulties in reproducibility. The problems arose from a difficulty in administering the ink distribution on the inking disk of the instrument.

One of the solutions to these problems was to devise an inking mechanism to overcome the heretofore ink distribution difficulties. Distributing systems made up entirely of metal rollers do not function properly, but a blade held at a proper clearance was found to spread an ink film directly on the inking disk in a most satisfactory way.

The approach taken was to mount the blade in a device permitting fine adjustment of the blade edge toward the surface of the inking disk. With the blade edge properly adjusted, the disk was then rotated to meter thereon the ink film. Because of the fine clearance involved other problems arose including the importance of maintaining concentricity of the rotating inking disk, the blade position and its parallelism to the disk face and the wear factor.

In an effort to avoid these problems and to maintain the necessary precision in an instrument that could be used reliably by an unskilled operator, the arrangement disclosed in my prior patent was devised. That arrangement consisted basically of two working parts which were adapted to be bolted onto the IGT print tester. A special inking disk with a recessed groove in its face 0.0006 inch deep and 1.7 centimeters wide, and, a scraper blade frictionally pressed against the inking disk by a weighted doctor blade arm made up the patented improvement. The edge of the blade was actually rounded to a 0.020 inch radius, however, tests indicated there would still be a great deal of wear. An experiment performed by IGT showed a 10 percent reduction in film thickness due to wear after only 150 tests.

As a result of further work, the blade was redesigned to minimize the wear problem. Subsequent changes employed a three-sixteenths inch precision steel rod as a blade mounted in a slot in the end of the lever arm. Also, the blade holder was designed to swivel at the end of the doctor blade arm so that the rod edge would be self-aligning with the face of the inking disk. During cleaning operations the rod could be easily removed, and, replaced by the operator in a random position. Thus the wear tended to be distributed around the rod rather than concentrated in one spot.

The apparent advantages of the improvement of my prior patent were a much shorter time required for testing, the more efficient distribution of the ink on the inking disk and the reduced cleaning time.

Further experiments with the doctor blade arrangement of my prior patent uncovered different problems and led to additional changes each of which make up the subject matter of the instant application. Using the rod as a doctor blade, inserted in a close fitting hole drilled in the blade holder, made it possible for the rod to rotate in the holder depending on the viscosity characteristics of the ink and the condition of the metal surfaces involved. This factor caused a variation in the ink film thickness applied to the inking disc. In order to obtain a reproducible application, a thumb set screw securing means was introduced to keep the rod from rotating during use. This new arrangement permitted easy removal of the doctor rod for cleaning, and, the preferred arrangement called for a screw of a softer metal than the rod to prevent defacement of the rod surface.

Additional attention was directed to the selection of the size of the doctor rod. It was found that a rod diameter which was too small became difficult for the operator to handle easily. If the rod was too large, it was less effective in doctoring the ink on the inking disk. As the diameter was increased, the breadth of the nip contact at the inking disk increased reducing the pressure for a given force loading. Increased diameter also produced a more gradually tapered entrance to the nip where a bead of ink pushed ahead of the blade exerted a large lifting force on the blade when high viscosity inks were used. These two effects made it very difficult with a rod of large diameter to wipe an ink of high viscosity cleanly from the bearing surface of the inking disk. If these surfaces could not be wiped clean, the clearance and ink film thickness would not be correct. These considerations led to the selection of an optimum rod diameter of three-sixteenths inch as the preferred size.

Subsequently, however, even with a rod of the preferred diameter, some difficulty was encountered with very viscous inks. To avoid this problem, the bearing surfaces on the inking disk were narrowed resulting in a wider groove and the weight on the end of the doctor blade arm was increased from 1 to 1½ pounds. With these modifications, the blade applicator of my prior patent operated satisfactorily without excess wear.

After installation of the doctor blade arrangement as set out above, another innovation became possible. It was discovered that a standard smooth-faced inking disk could be used if the inking groove were machined in the doctor rod. Thus the doctor rod would determine the ink film thickness deposited on the inking disk.

The smooth-faced disk is, of course, much less expensive than the special grooved disk. It is also much more versatile since it can be used with the roller distribution system normally employed with the IGT print tester. A smooth-faced disk also permits the use of a light chrome plating thereon to minimize wear and corrosion. Further, it becomes practical to use disks made of aluminum alloy for weighing the ink film before and after printing to determine ink transfer and other studies with this instrument. Such materials cannot ordinarily be machined with sufficient precision to make a satisfactory grooved disk.

The machining of a groove in the drill rod blade is easier and less expensive than on the inking disk. Since a grooved inking disk costs a great deal more, the lower cost of the grooved rod makes it possible from an economic standpoint for the user to have on hand a number of these grooved rod blades with different groove widths and depths. This provides increased versatility in the ink films useable and the variety of tests for which the blade applicator may be used.

This invention therefore resides in an improved ink doctoring assembly giving speedy, reproducible results at a reduced cost with more versatility than the device of my prior invention.

The invention will be more readily understood by reference to the following drawings and deailed description.

In the drawings:

FIGURE 1 is a side view of a standard IGT print tester showing the novel inking assembly in position;

FIGURE 2 is an end view of the IGT print tester of FIGURE 1;

FIGURE 3 is a partial perspective view showing the inking assembly on the tester housing;

FIGURE 4 is a perspective view of the novel doctor rod blade of the present invention;

FIGURE 5 is a partial cross-section of the mounting means for the novel rod blade.

The testing apparatus for which my invention is described is a standard IGT print tester designed and sold by the Stitching Instituut voor Grafische Technick T.N.O., Ter Gouwstraat 1, Amsterdam, Netherlands, and described in their information leaflets of May and September 1955. The operation of the IGT print tester is fully explained in the Manual of the I.G.T. Printability Tester, published May 1955.

The IGT print tester with my improved inking apparatus as shown in FIGURE 1 has a housing 10 and a printing sector 12 pivotally mounted thereon by spindle 20 for carrying the paper sample 14. The printing sector has an offset blanket 16 secured thereto on which the paper sample is placed, then, attached to the blanket by clamp 18. A second housing 11 is provided on the back side of the test apparatus which contains the driving means for the printing sector 12. The driving means preferred is a spring drive device manufactured by IGT as described in the aforementioned IGT information leaflet of May 1955. The printing sector is therefore spring loaded through a cocking means to provide the accelerated movement of the printing sector during the test. Lever 22 on the back side of the housing 10 is used to cock the printing sector in the ready condition. The acceleration of the printing sector spring drive is controlled by lever 24 which may be set at one of two acceleration rates after releasing the unlock button 26. With this embodiment better controlled and greater printing speeds may be obtained than with prior equipment.

The inking disk 28 shown in FIGURES 1 and 2 is rotatably attached on the housing 10 in any suitable manner. Since a conventional, or, smooth faced inking disk is used in this invention, the means of attachment employed by IGT is preferred. Detachable lever arm 30 is used to rotate the inking disk when it is desired to distribute the ink sample thereon. After the ink is applied, the handle is removed so that the test can be performed. Cranking lever 32 on the back side of the housing 10 is used to adjust the pressure between the printing sector 12 and inking disk 28. The pressure applied is recorded on a scale 34 provided on the front side of housing 10.

Each of the elements of the print tester described hereinabove are conventional.

The present improvement comprises the novel doctor rod blade ink applicator. In my prior patent, referred to hereinbefore, the inking disk had machined therein a groove which established the ink thickness applied to the inking disk to be used during a test. As shown in detail in FIGURE 3 of the instant application, the preferred inking disk is now smooth faced and, the groove is machined in the novel doctor rod blade 36. FIGURE 3 is a partial perspective view showing the doctor rod blade assembly in operating position. The novel doctor rod blade 36 with groove 38 machined therein is pressed radially against the inking disk 28 by means of the doctor blade arm and weight arrangement 40, 42 which applies force against the disk of approximately 15 pounds. As stated hereinbefore the weight 42 weighs approximately 1½ pounds.

FIGURE 4 shows in detail the construction of the novel doctor rod blade 36. A groove 38 in the doctor rod blade 0.00060 inch deep with a tolerance of plus or minus 0.00002 inch is used in the instant case as was used in the instant case as was used in the inking disk of my prior invention. The clearance of this groove under the doctor rod blade edge would be about 15 microns resulting in an ink film of about 12 microns as in the previous case. The groove depth set out above is, of course, the preferred arrangement with other groove depths available for different applications.

As pointed out earlier in this specification, problems were encountered in metering the ink on the inking disk until the doctor rod blade 36 was fixed in its mounting. FIGURE 5 shows a partial cross-section of the preferred thumb type set screw 39 used to hold the doctor rod blade fixed during the ink metering operation. The mounting 35 supporting the doctor rod blade 36 is shown as being attached to the doctor blade arm with a swivel attachment to maintain the desired parallelism between the inking disk 28 and doctor rod blade 36.

To operate the apparatus herein disclosed, the paper sample 14 is mounted on the printing sector 12 over the blanket 16 by means of the clamp 18. Lever arm 30 is then attached to the inking disk 28 and the doctor rod blade arm 40 is placed in position with the doctor rod blade 36 pressed against the inking disk 28. A small amount of standard testing ink is then placed on the inking disk 28 with a spatula, said amount being sufficient to meter onto the inking disk a sample having a thickness defined by the depth of the groove 38 in the doctor rod blade 36. The inking disk is then rotated at least two revolutions by lever arm 30 which is then removed prior to making the test. During the test, the doctor blade rod 36 is not in contact with the inking disk 28, its function being solely to meter the proper amount of ink onto the inking disk. The IGT tester is then operated in the standard manner by cocking the spring device or other acceleration means in the ready position, adjusting the pressure between the printing sector 12 and inking disk 28, and, then releasing the spring so that the printing sector 12 with the attached paper sample 14 will rotate against the inking disk 28. The test sample is then examined to determine the picking point.

In a first trial with an IGT tester, using my novel doctor rod blade inking assembly, the results obtained were deemed satisfactory with a visual inspection showing the ink application to be as good as the apparatus of my prior invention. It was noted also that because of the manner in which the ink is applied to the inking disk, the test simulated more exactly a letterpress type of printing.

It should be apparent to those skilled in the art that the invention is capable of numerous modifications, and, it is desired, therefore, not to limit the invention except as defined in the claims set forth below.

I claim:
1. In a pick tester of the class described comprising:
(a) a housing;
(b) a printing sector rotatably mounted on said housing;
(c) means to drive said printing sector;
(d) a smooth faced inking disk rotatably mounted on said housing and adapted to abut the periphery of said printing sector during a test;
(e) detachable means for rotating said inking disk;
(f) a doctor blade arm pivotally attached to said housing having a weight attached at one end thereof;
(g) a doctoring means supported in a swiveling mounting on the other end of said arm for metering an ink film onto said smooth faced inking disk in preparation for making a pick test, the improvement comprising a close fitting opening in said swiveling mounting for removably attaching one at a time, different nonrotatable cylindrical rod doctor blades thereto, each of said doctor blades having a different depth groove in the surface thereof for determining the ink film thickness metered onto the inking disk; and,
(h) set screw means on said swiveling mounting for locking each grooved doctor rod blade in a random position for each ink metering operation.

References Cited
UNITED STATES PATENTS

| | | | |
|---|---|---|---|
| 2,167,652 | 8/1939 | Hoch | 73—150 |
| 2,243,674 | 5/1941 | Hoch | 73—150 |
| 3,120,755 | 2/1964 | Walker | 73—150 |

OTHER REFERENCES
Henry A. Gardner Laboratory, Inc., pamphlet, December 1941, Parks Film-O-Graph, pp. 1-2, located in class 73, subclass 150.

S. CLEMENT SWISHER, *Acting Primary Examiner.*

J. NOLTON, *Assistant Examiner.*